(12) United States Patent
Jiang et al.

(10) Patent No.: US 12,445,280 B2
(45) Date of Patent: Oct. 14, 2025

(54) CYBER SECURITY AUTHENTICATION METHOD FOR DISPLAYLESS NETWORKING DEVICE

(71) Applicant: EverMore Technology Inc., Hsinchu (TW)

(72) Inventors: Jia-You Jiang, Hsinchu (TW); Tsu-Pin Weng, Hsinchu (TW); Wu-Hsiung Huang, Hsinchu (TW); Yuan-Sheng Chen, Hsinchu (TW); Hung-Ming Chen, Hsinchu (TW); Wen-Hsing Kuo, Hsinchu (TW)

(73) Assignee: EverMore Technology Inc., Hsinchu (TW)

( * ) Notice: Subject to any disclaimer, the term of this patent is extended or adjusted under 35 U.S.C. 154(b) by 146 days.

(21) Appl. No.: 18/383,522

(22) Filed: Oct. 25, 2023

(65) Prior Publication Data
US 2024/0405983 A1    Dec. 5, 2024

(30) Foreign Application Priority Data
May 31, 2023   (TW) ................................ 112120395

(51) Int. Cl.
*H04L 29/06* (2006.01)
*H04L 9/08* (2006.01)

(52) U.S. Cl.
CPC ............ *H04L 9/088* (2013.01); *H04L 9/0861* (2013.01)

(58) Field of Classification Search
CPC ..... H04L 9/088; H04L 9/0861; H04L 9/0838; H04L 9/0844; H04L 63/04; H04W 12/0471; H04W 12/06; H04W 76/10; H04W 84/12
See application file for complete search history.

(56) References Cited

U.S. PATENT DOCUMENTS

| | | | |
|---|---|---|---|
| 8,532,304 B2* | 9/2013 | Asokan ................. | H04W 48/20 713/153 |
| 2013/0016710 A1* | 1/2013 | Shinohara ............. | H04W 88/02 370/338 |
| 2014/0068719 A1* | 3/2014 | Kiukkonen ........... | H04W 12/50 726/4 |
| 2019/0332774 A1* | 10/2019 | Nix ....................... | H04W 12/50 |

* cited by examiner

*Primary Examiner* — Yogesh Paliwal
(74) *Attorney, Agent, or Firm* — Demian K. Jackson; Jackson IPG PLLC

(57) ABSTRACT

The present invention relates to a cyber security authentication method for a displayless networking device. The method includes randomly generating an ephemeral decryption key in a displayless networking device application server; providing the ephemeral decryption key and a network address of the displayless networking device to a user device via an optical identifier; initiating a multi-party multi-factor dynamic strong encryption authentication scheme in the user device based on the ephemeral decryption key and the network address to obtain an ephemeral credential; and authenticating an identity information based on the ephemeral decryption key and the ephemeral credential at least by the user device, the displayless networking device application server, and a security server.

10 Claims, 7 Drawing Sheets

CYBER SECURITY AUTHENTICATION METHOD FOR DISPLAYLESS NETWORKING DEVICE

CROSS-REFERENCE TO RELATED APPLICATION

This application claims priority benefit to Taiwan Invention patent application No. 112120395, filed on May 31, 2023, in Taiwan Intellectual Property Office, the entire disclosures of which are incorporated by reference herein.

FIELD

The present invention relates to a cyber security authentication method, in particular to a cyber security authentication method for a displayless networking device such as a router device.

BACKGROUND

According to the prior technology, the administrator account and password for a router are very easy to be hacked. The main reason is that many users like to use simple passwords, such as "123456", "password", and other simple passwords or weak passwords when setting the router administrator accounts and passwords. However, for hackers, they only need to try all possible password combinations repeatedly to crack the weak passwords, and then they can hack into the router's administrator interface.

The second reason is that many users do not reset the router product's default password. Routers come with default temporary administrator accounts and passwords, but these default passwords are also weak passwords and usually have fixed rules, such as admin/admin, root/root, and so on. Users often forget or directly use these default passwords, in which case hackers can crack these default accounts and passwords using brute force filling techniques.

In addition, the router firmware itself may have unknown vulnerabilities that can be exploited by hackers. These firmware vulnerabilities can be caused by manufacturer negligence, old firmware versions, and the use of firmware that has not been updated in a long time. In this case, even if a user sets a strong password, hackers can still break into such a router through known vulnerabilities.

In general, the reason that router administrator accounts and passwords are so easy to crack is that most users are not aware of router network security and don't think of routers as important devices, so they don't set strong passwords. What they don't realize is that all information, including sensitive information, must pass through the router. However, most users are not information security professionals with knowledge of information security, so it is normal for router consumers to lack awareness of router network-related security.

There are also many hacking techniques, including phishing, Trojan embedding, keystroke logging, SQL implantation, intermediate attacks, and large-scale distributed denial-of-service (DDoS) attacks, etc. Hackers can easily crack the router account and password through these techniques, especially when many users are less concerned about the network security of routers, devices such as routers are directly exposed to the risk of hacker attacks.

In summary, in view of the fact that routers and other network devices that belong to the same network devices as routers face the above-mentioned cyber security problems, it is necessary to propose corresponding cyber security measures to solve the above-mentioned cyber security problems.

SUMMARY

The present invention relates to a cyber security authentication method, in particular to a cyber security authentication method for a displayless networking device such as a router device.

Accordingly, the present invention provides a cyber security authentication method. The method includes the steps of randomly generating an ephemeral decryption key in a displayless networking device application server; providing the ephemeral decryption key and a network address of the displayless networking device to a user device via an optical identifier; initiating a multi-party multi-factor dynamic strong encryption authentication scheme in the user device based on the ephemeral decryption key and the network address to obtain an ephemeral credential; and authenticating an identity information based on the ephemeral decryption key and the ephemeral credential at least by the user device, the displayless networking device application server, and a security server.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
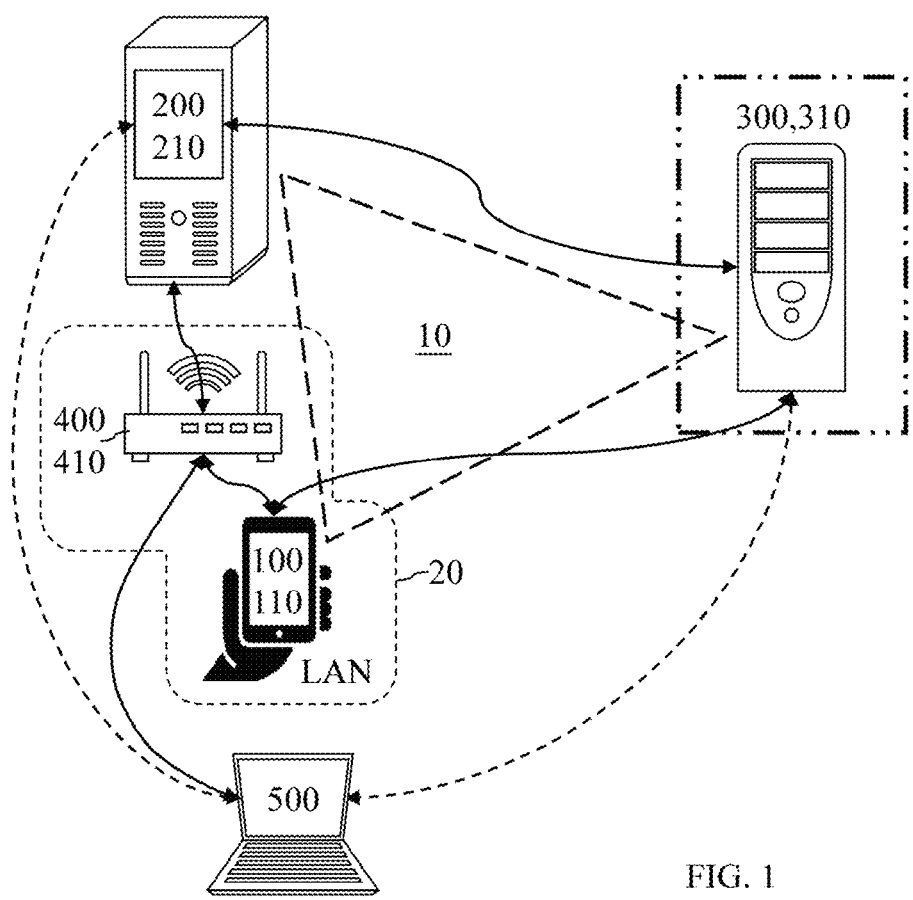
FIG. 1 is a schematic diagram illustrating a system architecture for a cyber security authentication system for a displayless networking device according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the authentic technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a schematic diagram illustrating a system architecture for a cyber security authentication system for a displayless networking device according to the present invention. In this embodiment, the cyber security authentication system 10 for a displayless networking device according to the present invention is referred to as a multi-device multi-factor dynamic strong encryption authentication system, and includes at least a user device 100 operated by a user, a displayless networking device application server 200, a security server 300, a displayless networking device 400, and a display-attached network device 500. The equipment and devices establish communication links and transmission connections with each other over the Internet to exchange messages and information.

The displayless networking device 400 refers to a networking device that is used to organize and build a network or provide intermediary between network nodes, and is generally manufactured without any built-in display. When it is necessary to set up, configure, or manage the displayless networking device 400, the user needs to access to access, log in, and operate a dedicated web-based network device management platform or a mobile application backend management program based on PaaS technology and that is built and run on the displayless networking device application server 200, by using another third-party device, i.e. the display-attached network device 500, so as to set up, configure, or manage the displayless network device 400.

The displayless networking device 400 does not provide any built-in monitors for a number of reasons, including, but not limited to, cost, utilization rate, or ease of use considerations. A common displayless networking device 400 includes, but is not limited to, a small cell, a router, a hub, a switch, a bridge, a gateway, a brouter, a relay, a repeater, an edge server, a microcontroller (MCU), a processor, an automated teller machine (ATM), a point-of-sale machine (POS), a machine tool, a programmable logic controller (PLC), an unmanned vehicle (UAV), an IP cam, a satellite phone, a CAN bus node, a network address translation (NAT), a server loading balancing device and an application delivery controller, or an application switch, etc.

The display-attached network device 500 is preferably, for example, but not limited to, a desktop computer, a notebook computer, a tablet device or a smart phone, etc. In this embodiment, the display-attached network device 500 is preferably the notebook computer. The user device 100 is preferably, for example but not limited to, a desktop computer, a notebook computer, a tablet device or a smart phone, etc. In this embodiment, the user device 100 is preferably the smart phone.

In this embodiment, the displayless networking device 400 and the user device 100 are both preferably located within the same local area network (LAN) 20, and the displayless networking device 400 and the display-attached network device 500 may or may not be located in the same LAN 20. The user device 100, the displayless networking device application server 200, and the security server 300 form a main three-way transmission relationship. The security server 300 is a third-party intermediary security device built and provided by a third-party cyber security service provider. The displayless networking device 400 and the displayless networking device application server 200 may be combined into a single device, or they may be two devices that are communicatively connected to each other but are separate and independent from each other. In this embodiment, the displayless networking device 400 and the displayless networking device application server 200 are two devices that are communicatively connected to each other but are separate and independent from each other.

The actual implementation of the cyber security authentication method for the displayless networking device included in the present invention is in the form of, for example, but not limited to, an agent program, an application program, or a service program. These programs are preinstalled and run on the user device 100, the displayless networking device application server 200, the security server 300, and the displayless networking device 400. In this embodiment, a first application program 110, a second service program 210, a third service program 310, and a fourth agent program 410 are installed in the user device 100, the displayless networking device application server 200, the security server 300, and the displayless networking device 400, respectively, to cross-device implement a multi-party multi-factor dynamic strong encryption authentication among the user device 100, the displayless networking device application server 200, the security server 300, and the displayless networking device 400. It provides information security protection and enhances the network security for the displayless networking device 400.

Figure 2:
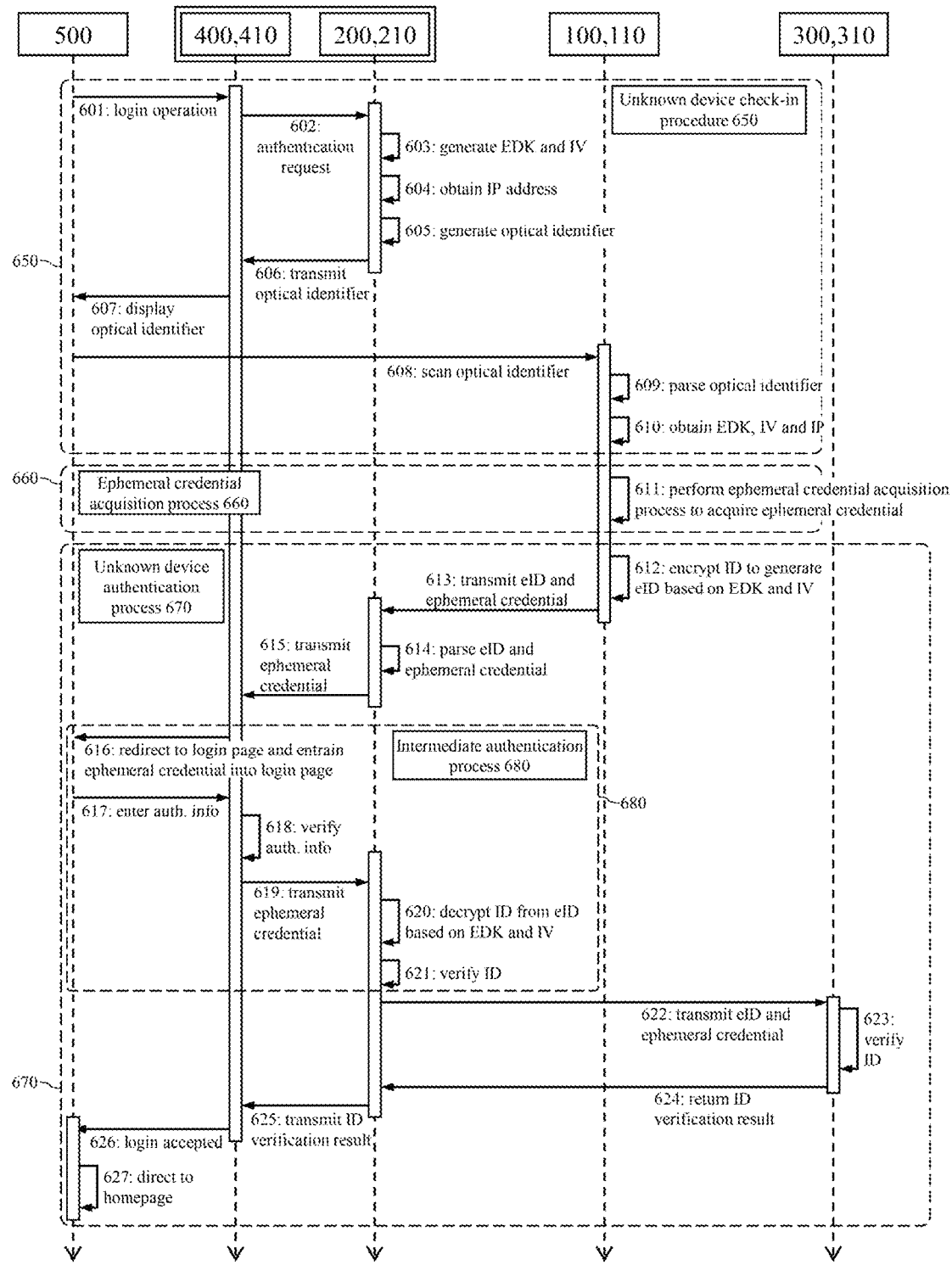
FIG. 2 is a time sequence diagram illustrating execution steps for a cyber security authentication method for a displayless networking device according to the present invention.

FIG. 2 is a time sequence diagram illustrating execution steps for a cyber security authentication method for a displayless networking device according to the present invention. In this embodiment, the cyber security authentication method for displayless networking device is implemented based on the cyber security authentication system 10. Since the displayless networking device 400 does not provide a built-in monitor, the user needs to use another display-attached network device 500 when the user wants to set up, configure or manage the displayless networking device 400. By operating the web browser executed on the display-attached network device 500, the user accesses, logs in, and operates a web network device management platform provided by the displayless networking device application server 200, and the user can set up, configure or manage the displayless networking device 400. In this embodiment, the displayless networking device 400 and the displayless networking device application server 200 are combined into one device.

In this embodiment, the cyber security authentication method for a displayless networking device includes multiple steps implemented in the following sequence:

STEP 601: First, the user operates a web browser through the display-attached network device 500 to access a login page of the web network device management platform provided by the displayless networking device application server 200, and sets up, configures or manages the displayless networking device 400 by operating the web network device management platform.

STEP 602: In response to the user accessing the login page, the fourth agent program 410 executed on the displayless networking device 400 sends an authentication request message to the second service program 210 executed on the displayless networking device application server 200, and requests the second service program 210 to start executing an unknown device check-in procedure 650 included in the cyber security authentication method for displayless networking device.

STEP 603: After the second service program 210 executed on the displayless networking device application server 200 receives the authentication request message from the fourth agent program 410 executed on the displayless networking device 400. In response to the confirmation of the authentication request message, the second service program 210 begins to implement a first cryptographic algorithm to generate, for example, but not limited to, a first ephemeral decryption keys (first EDK) and a required initialization vector (IV). Alternatively, the second service program 210 generates the first EDK having a length of 32 bytes randomly.

The first cryptographic algorithm is preferably selected from a RSA algorithm, a DSA algorithm, a MD5 algorithm, a MD4 algorithm, a MD2 algorithm, a SHA-1 algorithm, a SHA-2 algorithm, a SHA-3 algorithm, a RIPEMD-160 algorithm, a MDC-2 algorithm, a GOST R 34.11-94 algorithm, a BLAKE2 algorithm, a Whirlpool algorithm, a SM3 algorithm or a combination thereof.

STEP 604: The second service program 210 obtains the IP address of the displayless networking device 400.

STEP 605: The second service program 210 encodes the first EDK, IV and IP addresses, and generates an optical identifier according to the optical identifier encoding rules to store the first EDK, IV and IP addresses in an optical identifier. The type of the optical identifier is, for example but not limited to, a two-dimensional pattern code, such as a QR code. In this embodiment, the stored content of the decoded optical identifier is, for example but to: not limited https://tekpass.com.tw/phantom?token=EDKIV&receiver=IPADD, wherein the string EDKIV is the first EDK and IV information, and the string IPADD is the IP address of the displayless networking device 400.

STEP 606: The second service program 210 executed on the displayless networking device application server 200 returns the generated optical identifier back to the fourth agent program 410, executed on the displayless networking device 400.

STEP 607: The fourth agent program 410 preferentially displays the received optical identifier at the top of the login page of the display-attached network device 500 being ready to be sensed by the lens of the user-operated user device 100.

STEP 608: Next, the user opens the first application program 110 installed on the user device 100 and enters and clicks on the identifier sensing interface provided by the first application program 110. The lens included in the user device 100 is moved to aim at the optical identifier displayed at the top of the login page of the display-attached network device 500, and then the lens captures the image of the optical identifier.

STEP 609: After the first application program 110 has successfully retrieved the optical identifier displayed by the display-attached network device 500, the first application program 110 parses whether the captured optical identifier complies with the optical identifier encoding rules to verify the authenticity of the optical identifier, such as whether or not it has been altered.

STEP 610: When the first application program 110 confirms that the retrieved optical identifier is authentic, the first application program 110 decodes the optical identifier according to the optical identifier encoding rules, to obtain the first EDK, IV, and IP addresses stored in the optical identifier.

Then the first application program 110 is configured to further bind the IP address of the displayless networking device 400 to the identity information (ID) registered by the user in the first application program 110 and associated with the user device 100. Thus, the unknown device check-in procedure 650 is completed, and the identity information is bound to the user device 100 and the displayless networking device 400.

STEP 611: After the first application program 110 obtains the first EDK, IV, and IP addresses, the first application program 110 begins to execute an ephemeral credential acquisition process 660 to acquire an ephemeral credential (authentication token), so as to continue with the following steps subject to the authorization of the ephemeral credential. The ephemeral credential acquisition process 660 includes: the first application program 110 implementing a multi-party multi-factor dynamic strong encryption authentication scheme included in the cyber security authentication method for the displayless networking device based on the first EDK, IV, and IP addresses to generate an authentication token to be the ephemeral credential.

STEP 612: After the first application program 110 has gone through and passed the ephemeral credential acquisition process 660, the ephemeral credential and the required authorization of the ephemeral credential are properly acquired, and an unknown device authentication process 670 is subsequently performed based on the authorization of the ephemeral credential.

The first application program 110 implements a second cryptographic algorithm based on the first EDK and IV to encrypt the identity information registered in the first application program 110 and bound to the user device 100 to generate a set of encrypted data (eID).

The second cryptographic algorithm is preferably selected from a DSA algorithm, an ECDSA algorithm, an ECC algorithm, a HMAC algorithm, a MD5 algorithm, a MD4 algorithm, a MD2 algorithm, a SHA-1 algorithm, a SHA-2 algorithm, a SHA-3 algorithm, a RIPEMD-160 algorithm, a MDC-2 algorithm, a GOST R 34.11-94 algorithm, a BLAKE2 algorithm, a Whirlpool algorithm, a SM3 algorithm or a combination thereof.

STEP 613: The first application program 110 returns the encrypted data and the ephemeral credential back to the second service program 210 executed on the displayless networking device application server 200.

STEP 614: After acknowledging the receipt of the encrypted data and the ephemeral credential, the second service program 210 parses whether the received encrypted data and the ephemeral credential comply with the encrypted data encoding rules and the ephemeral credential encoding rules, respectively, to verify the authenticity of the encrypted data and the ephemeral credential, such as whether or not they have been altered.

STEP 615: When the second service program 210 confirms that both the encrypted data and the ephemeral credential are authentic, based on the authorization of the ephemeral credential, the web network device management platform is instructed to return the web browser on the display-attached network device 500 to the original login page, and the second service program 210 transmits the ephemeral credential to the fourth agent program 410 executed on the displayless networking device 400.

STEP 616: The display-attached network device 500 redirects the web browser to the original login page for the user to enter authentication information, including account and password, for logging into the web network device management platform. After receiving the ephemeral credential, the fourth agent program 410 is configured to entrain the ephemeral credential into the login page based on the authorization of the ephemeral credential.

STEP 617: The user enters the authentication information in the login page by operating the web browser executed on the display-attached network device 500.

STEP 618: When the fourth agent program 410 running on the displayless networking device 400 confirms that the user has completed the input of the authentication information in the login page, in response to the input of the authentication information, the fourth agent program 410 verifies whether the authentication information is correct or not.

STEP 619: When the input authentication information is confirmed as correct by the fourth agent program 410, the fourth agent program 410 transmits the ephemeral credential to the second service program 210 and, based on the authorization of the ephemeral credential, sends a verification request message to the second service program 210, and requests the second service program 210 to verify the identity information.

STEP 620: After the second service program 210 executed on the displayless networking device application server 200 receives the verification request message from the fourth agent program 410 executed on the displayless networking device 400, in response to the confirmation of the verification request message, the second service program 210 implements the third cryptographic algorithm to decrypt the encrypted data (eID) based on the first EDK and the IV in order to retrieve the identity information.

STEP 621: After retrieving the identity information, the second service program 210 performs an identity information verification process to verify whether the identity information matches the authentication information or the records.

The above-mentioned steps 616 to 621 are also referred to as an intermediate authentication process 680. Alternatively, the intermediate authentication process 680 includes the above-mentioned steps 616 to 621.

STEP 622: When the second service program 210 confirms that the retrieved identity information matches the authentication information or the records, the second service program 210 transmits the identity information and the ephemeral credential to the third service program 310 executed on the security server 300, sends an authentication request message to the third service program 310 based on the authorization of the ephemeral credential, and requests the third service program 310 to authenticate the identity information.

STEP 623: When the third service program 310 executed on the security server 300 confirms the receipt of the identity information and the ephemeral credential, the third service program 310 starts an identity authentication process to authenticate the identity information based on the authorization of the ephemeral credential.

STEP 624: When the third service program 310 confirms that the identity information matches the authentication information or the records, the third service program 310 sends a notification message indicating that the identity authentication process has passed, and forwards it to the displayless networking device 400 via the second service program 210 to notify the fourth agent program 410 that the identity information is authentic.

STEP 625: When the second service program 210 acknowledges the receipt of the notification message, it continues to forward the notification message to the fourth agent program 410.

STEP 626: After the fourth agent program 410 acknowledges the receipt of the notification message, the fourth agent program 410 accepts the user to log in to the web network device management platform, and the user successfully logs in to the web network device management platform on the displayless networking device application server 200 from the display-attached network device 500.

STEP 627: The fourth agent program instructs the display-attached network device 500 to redirect the web browser to the homepage, whereby the user operates the web network device management platform through the display-attached network device 500 to set up, configure or manage the displayless networking device 400.

Figure 3:
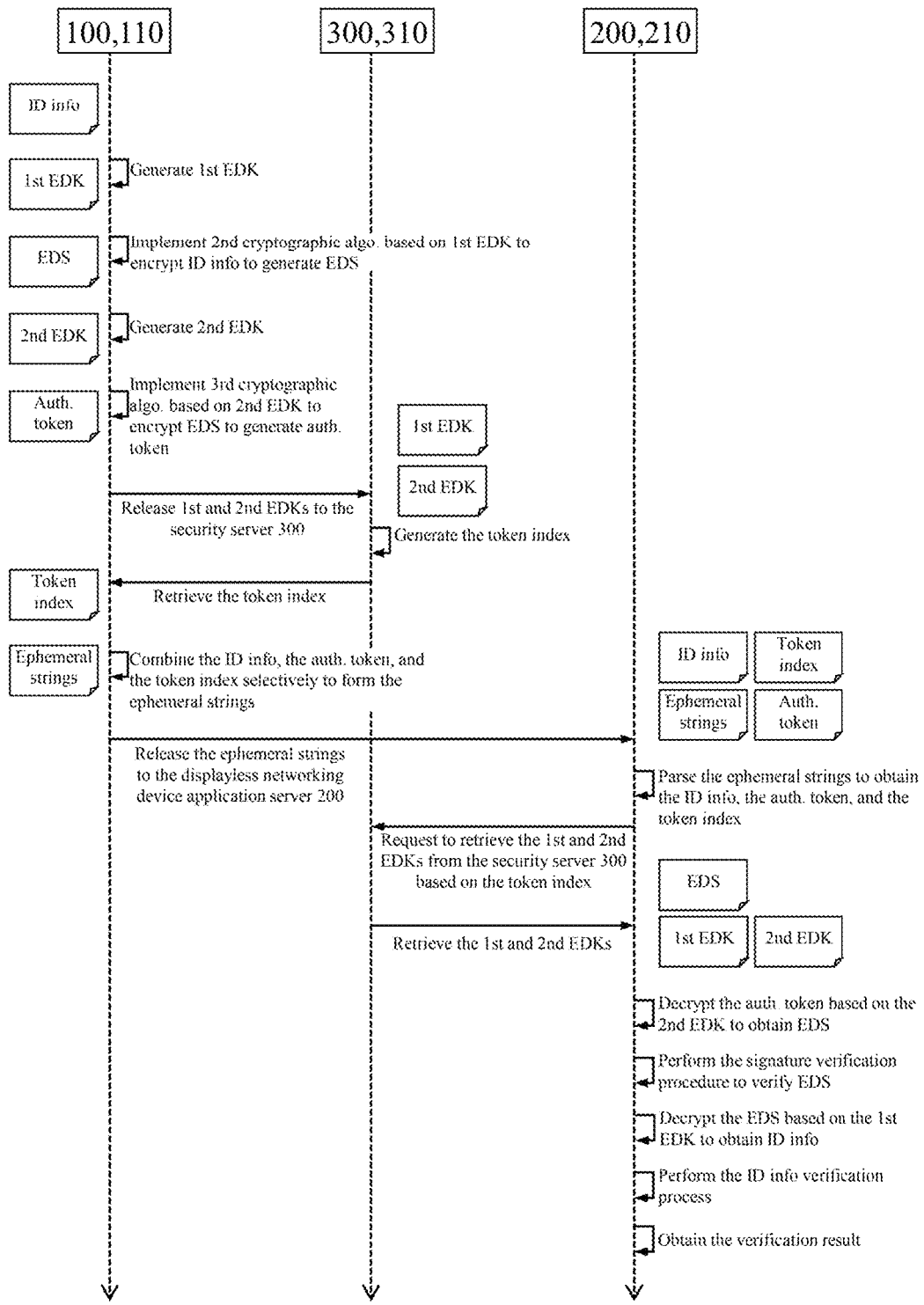
FIG. 3 is a time sequence diagram illustrating execution steps for a multi-party multi-factor dynamic strong encryption authentication scheme according to the present invention.

FIG. 3 is a time sequence diagram illustrating execution steps for a multi-party multi-factor dynamic strong encryption authentication scheme according to the present invention. In the STEP 611, after the first application program 110 obtains the first EDK, IV and IP addresses, the first application program 110 begins executing the ephemeral credential acquisition process 660 to generate the ephemeral credential. The ephemeral credential acquisition process 660 is also referred to as the multi-party multi-factor dynamic strong encryption authentication scheme.

The ephemeral credential acquisition process 660 includes multiple steps that are implemented sequentially as follows: initially, based on the generated first EDK, the first application program 110 continues to implement the second cryptographic algorithm based on the first ephemeral decryption key to encrypt the identity information to generate an electronic digital signature (EDS) on the user device 100. The second cryptographic algorithm is preferably used to generate the electronic digital signature.

After the electronic digital signature is generated on the user device 100, the first application program 110 continues to implement a scrambling process based on the first ephemeral decryption key to vary the first ephemeral decryption key to generate the second ephemeral decryption key (second EDK).

After the second ephemeral decryption key is generated on the user device 100, the first application program 110 continues to implement a third cryptographic algorithm based on the second ephemeral decryption key on the user device 100 to further encrypt the electronic digital signature to generate an authentication token to be the ephemeral credential. The third cryptographic algorithm is also known as a secure encryption algorithm, preferably a symmetric encryption algorithm.

The third cryptographic algorithm is preferably selected from a AES algorithm, a RSA algorithm, a DSA algorithm, a HMAC algorithm, a MD5 algorithm, a MD4 algorithm, a MD2 algorithm, a SHA-1 algorithm, a SHA-2 algorithm, a SHA-3 algorithm, a Blowfish algorithm, a Camellia algorithm, a Chacha20 algorithm, a Poly 1305 algorithm, a SEED algorithm, a CAST-128 algorithm, a DES algorithm, an IDEA algorithm, a RC2 algorithm, a RC4 algorithm, a RC5 algorithm, a SM4 algorithm, a TDES algorithm, a GOST 28147-89 algorithm or a combination thereof.

Next, the first application program 110 releases the generated the first ephemeral decryption key and the second ephemeral decryption key from the user device 100 to the security server 300, and the third service program 310 executed on the security server 300 generates a key index based on the first ephemeral decryption key and the second ephemeral decryption key. The key index is the least content or strictly smaller portion sufficient to extract the information of the first ephemeral decryption key and the second ephemeral decryption key. Next, the first application program 110 executed on the user device 100 requests and retrieves the corresponding key index from the third service program 310 executed on the security server 300. The first ephemeral decryption key and the second ephemeral decryption key may be in any form, preferably a string of symbols of 256 binary bits in length.

Selectively, the first application program 110 combines the identity information, the generated authentication token, and the retrieved key index to form a set of ephemeral strings as the ephemeral credential. The ephemeral credential is then transmitted from the user device 100 to the displayless networking device application server 200.

On the displayless networking device application server 200, when the second service program 210 installed on the displayless networking device application server 200 receives the ephemeral credential, it parses the ephemeral string contained in the ephemeral credential to obtain the identity information, the key index, and the authentication token from the ephemeral credential. The obtained key index is then transmitted to the third service program 310 on the security server 300 via an encrypted mode or an unencrypted mode to retrieve the corresponding first ephemeral decryption key and the second ephemeral decryption key stored on the security server 300 from the third service program 310 based on the key index.

Next, on the displayless networking device application server 200, the second service program 210 executes a third cryptographic algorithm based on the received second ephemeral decryption key to decrypt the authentication token into the electronic digital signature, and executes a signature verification procedure with the first ephemeral decryption key to verify whether the electronic digital signature has been correctly signed. After confirming that the electronic digital signature has been correctly signed, the electronic digital signature is decrypted into the identity information.

When the signature verification procedure is completed, the second service program 210 on the displayless networking device application server 200 decides whether the user is allowed to log in based on the verification result. Only if the signature verification procedure is correct, the user is allowed to access, log in, and operate the dedicated web network device management platform built on the displayless networking device application server 200 based on PaaS technology to set up, configure, or manage the the displayless networking device 400 by operating a web browser executed on the display-attached network device 500. Otherwise, the user is rejected to log in to the dedicated network device management platform.

After all authentication procedures have been performed, the the first ephemeral decryption key and the second ephemeral decryption key temporarily stored in the user device 100, the displayless networking device application server 200 and the security server 300, as well as the identity information, the electronic digital signature, the authentication token, the ephemeral credential, and the key index temporarily stored on the user device 100 and the displayless networking device application server 200 are automatically deleted.

Figure 4:
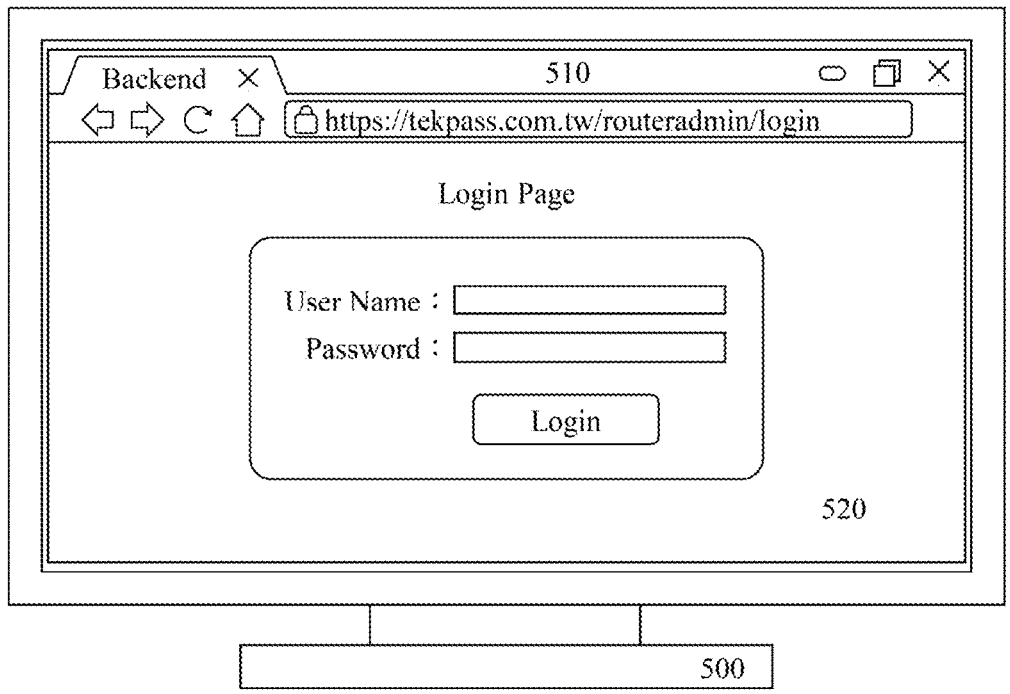
FIG. 4 is a schematic diagram illustrating a login page of a web network device management platform displayed by a web browser of a display-attached network device according to the present invention.

FIG. 4 to FIG. 10 are schematic diagrams illustrating overall usage scenarios for a cyber security authentication method for displayless networking device according to the present invention. FIG. 4 is a schematic diagram illustrating a login page of a web network device management platform displayed by a web browser of a display-attached network device according to the present invention. When an administrator intends to set up, configure, or manage the displayless networking device 400, the user must use the display-attached network device 500. By operating a web browser running on the display-attached network device 500, the administrator accesses, logs into, and operates a dedicated web network device management platform running on the displayless networking device application server 200, and the administrator can set up, configure, or manage the displayless networking device 400. As shown in FIG. 4, a user uses a web browser 510 running on the display-attached network device 500 to access to a login page 520 of the web network device management platform, as previously described in STEP 601.

Figure 5:
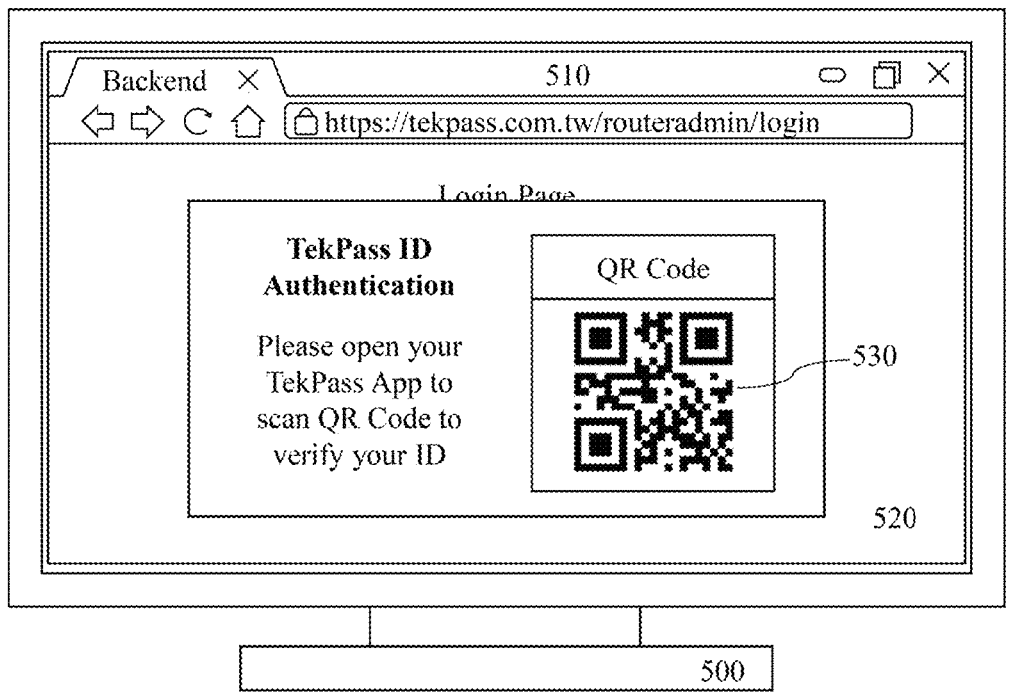
FIG. 5 is a schematic diagram illustrating an optical identifier displayed at the top of a login page of a web network device management platform in a web browser of a display-attached network device according to the present invention.

FIG. 5 is a schematic diagram illustrating an optical identifier displayed at the top of a login page of a web network device management platform in a web browser of a display-attached network device according to the present invention. Once the administrator accesses the login page 520 via the web browser 510, the system identifies this access as an authentication request and begins to randomly generate a set of the ephemeral decryption keys and the optical identifier 530, wherein the optical identifier 530 contains and stores the ephemeral decryption keys and the IP address of the displayless networking device 400. Then, the optical identifier 530 is displayed at the top of the login page 520 displayed by the web browser 510 executed on the display-attached network device 500, as previously described in STEP 602 to STEP 607.

Figure 6:
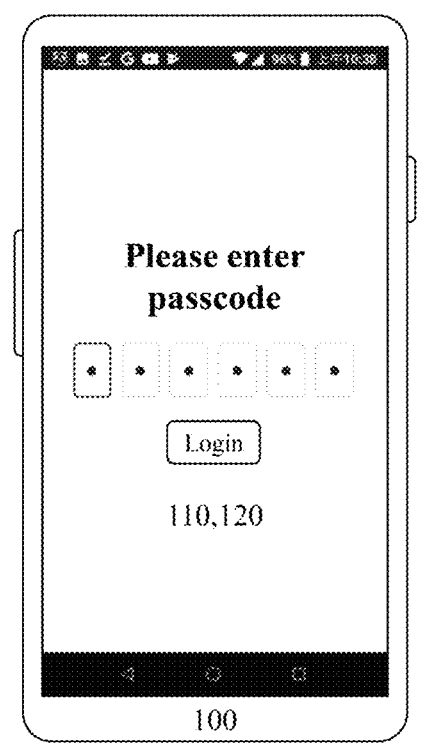
FIG. 6 is a schematic diagram illustrating a passcode entry page provided by a first application program launched on a user device according to the present invention.

FIG. 6 is a schematic diagram illustrating a passcode entry page provided by a first application program launched on a user device according to the present invention. The administrator then launches the first application program 110 on his/her own user device 100. When the first application program 110 is launched, a passcode entry page 120 is first displayed, requiring the administrator to input his/her own passcode, as previously described in STEP 602 to STEP 607.

Figure 7:
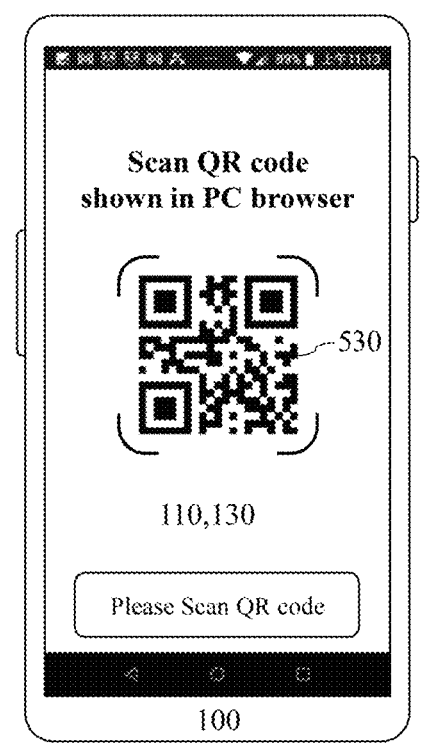
FIG. 7 is a schematic diagram illustrating an identifier sensing interface provided by a first application program executed on a user device according to the present invention.

FIG. 7 is a schematic diagram illustrating an identifier sensing interface provided by a first application program executed on a user device according to the present invention. The administrator then operates the user device 100 to enter the identifier sensing interface 130 provided by the first application program 110, and moves the lens of the user device 100 to aim at the optical identifier 530 displayed at the top of the login page 520 to capture the pattern of the optical identifier 530, as previously described in STEP 608.

Figure 8:
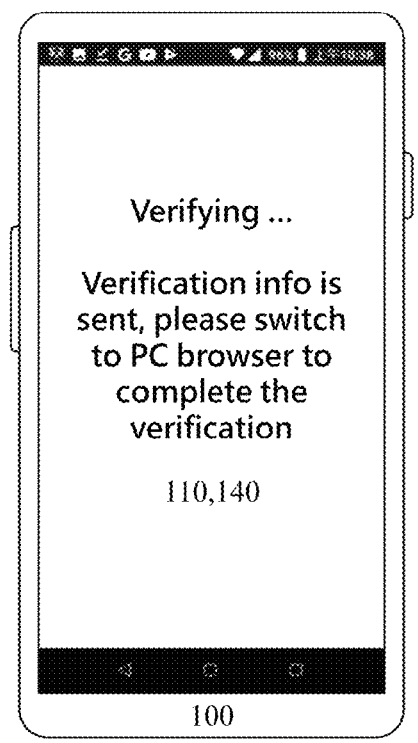
FIG. 8 is a schematic diagram illustrating a verification information transmission notification page provided by a first application program executed on a user device according to the present invention.

FIG. 8 is a schematic diagram illustrating a verification information transmission notification page provided by a first application program executed on a user device according to the present invention. After the user successfully captures the optical identifier 530, the system executes STEP 609 through STEP 616. After the system completes STEP 609 to STEP 616, the system notifies the administrator that the verification information has been delivered by displaying a verification information transmission notification page 140 by the first application program 110 executed on the user device 100.

Figure 9:
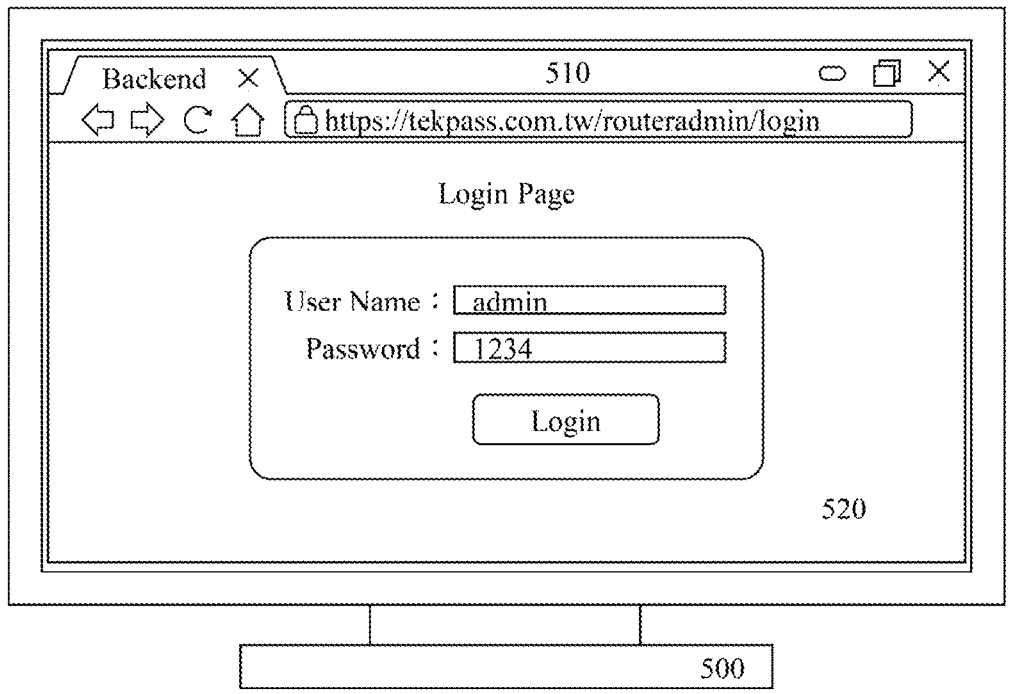
FIG. 9 is a schematic diagram illustrating a login page of a web network device management platform displayed in a web browser running on a display-attached network device according to the present invention.

FIG. 9 is a schematic diagram illustrating a login page of a web network device management platform displayed in a web browser running on a display-attached network device according to the present invention. Next, the web browser 510 running on the display-attached network device 500 redirects back to the login page 520, and allows the administrator to enter his/her authentication information, including the account and the password. As shown in STEP 617.

Figure 10:
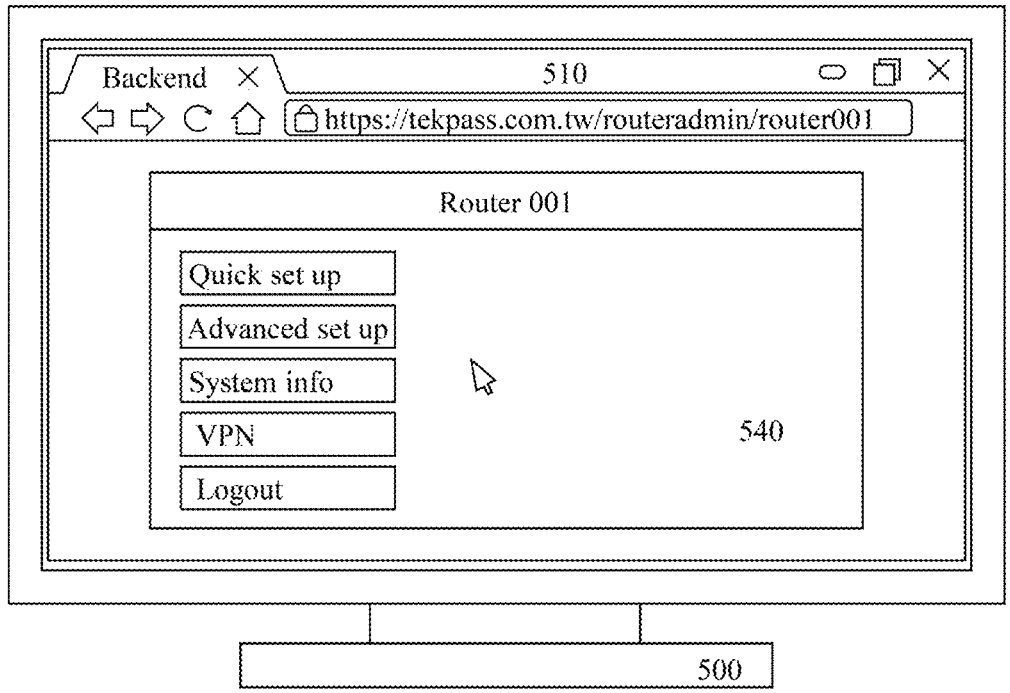
FIG. 10 is a schematic diagram illustrating a homepage of a web network device management platform displayed by a web browser running on a display-attached network device according to the present invention.

FIG. 10 is a schematic diagram illustrating a homepage of a web network device management platform displayed by a web browser running on a display-attached network device according to the present invention. After the user enters his/her authentication information and the system confirms that the authentication information is authentic and correct, the system performs the above STEP 618 to STEP 626 to verify the identity information. After the system has completed STEP 618 to STEP 626, and the identity information is verified as authentic and correct, the system instructs the web browser 510 running on the display-attached network device 500 to redirect to a homepage 540 of the web network device management platform.

There are further embodiments provided as follows.

Embodiment 1: A cyber security authentication method includes steps of: randomly generating an ephemeral decryption key in a displayless networking device application server; providing the ephemeral decryption key and a network address of the displayless networking device to a user device via an optical identifier; initiating a multi-party multi-factor dynamic strong encryption authentication scheme in the user device based on the ephemeral decryption key and the network address to obtain an ephemeral credential; and authenticating an identity information based on the ephemeral decryption key and the ephemeral credential at least by the user device, the displayless networking device application server, and a security server.

Embodiment 2: The cyber security authentication method according to Embodiment 1, further includes an unknown device binding procedure, wherein the unknown device binding procedure further includes one of: operating a web browser executed and displayed in a display-attached network device to access a login page of a network device management platform for managing the displayless networking device by performing an access action through the display-attached network device; in response to the access action, randomly generating the ephemeral decryption key in the displayless networking device application server and obtaining the network address of the displayless networking device; generating the optical identifier in the displayless networking device application server and storing the ephemeral decryption key and the network address in the optical identifier; displaying the optical identifier at the top of the login page displayed by the web browser; sensing the optical identifier by operating the user device to obtain the ephemeral decryption key and the network address in the user device; and binding the network address with the identity information.

Embodiment 3: The cyber security authentication method according to Embodiment 2, the multi-party multi-factor dynamic strong encryption authentication scheme further includes one of: in the user device: receiving the first ephemeral decryption key; forming a second ephemeral decryption key based on a part of the first ephemeral decryption key to encrypt the identity information to generate an electronic digital signature, and create an authentication token as the ephemeral credential accordingly; releasing the first ephemeral decryption key and the second ephemeral decryption key to the security server and retrieving a key index from the security server; and selectively combining the identity information, the key index, and the authentication token to form an ephemeral string as the ephemeral credential.

Embodiment 4: The cyber security authentication method according to Embodiment 2, further includes an unknown device authentication procedure, wherein the unknown device authentication procedure further includes one of: in the user device, encrypting the identity information into an encrypted data based on the ephemeral decryption key; transmitting the encrypted data and the ephemeral credential from the user device to the displayless networking device application server; and transmitting the ephemeral credential from the displayless networking device application server to the displayless networking device.

Embodiment 5: The cyber security authentication method according to Embodiment 4, the unknown device authentication procedure further includes an intermediate authentication process, wherein the intermediate authentication process further includes one of: instructing the web browser executed in the display-attached network device to redirect back to the login page by the displayless networking device application server to provide for the user to enter an authentication information for logging into the network device management platform, and carrying the ephemeral credential in the login page; providing the login page by the web browser for the user to enter the authentication information in the login page by operating the web browser; verifies whether the authentication information is correct or not in the displayless networking device; when the authentication information is confirmed as correct in the displayless networking device, returning the ephemeral credential back to the displayless networking device application server and requesting the displayless networking device application server to authenticate the identity information; decrypting the encrypted data in the displayless networking device application server based on the ephemeral decryption key to obtain the identity information; and verifying whether the identity information matches the authentication information in the displayless networking device application server.

Embodiment 6: The cyber security authentication method according to Embodiment 5, the unknown device authentication procedure further includes one of: when it is confirmed that the identity information matches the authentication information in the displayless networking device application server, transmitting the ephemeral credential and the identity information to the security server and requesting the security server to authenticate the identity information; receiving the identity information by the security server; authenticating the identity information by the security server; returning an authentication result back to the displayless networking device application server from the security server; receiving the authentication result by the displayless networking device application server; and when the authentication result is authentic, instructing the web browser executed in the display-attached network device to redirect to a homepage of the network device management platform by the displayless networking device application server.

Embodiment 7: The cyber security authentication method according to Embodiment 3, further includes one of: in the user device: randomly generating a first ephemeral decryption key based on the identity information; generating a second ephemeral decryption key based on a part of the first ephemeral decryption key to encrypt the identity information to generate an electronic digital signature, and create an authentication token accordingly; releasing the first ephemeral decryption key and the second ephemeral decryption key to the security server and retrieving a key index from the security server; and combining the identity information, the key index, and the authentication token to form an ephemeral string as the ephemeral credential, and transmitting the ephemeral credential to the displayless networking device application server; and in the displayless networking device application server: parsing the ephemeral string included in the ephemeral credential to obtain the identity information, the key index, and the authentication token and requesting the security server to retrieve the first ephemeral decryption key and the second ephemeral decryption key based on the key index; and decrypting the authentication token based on the first ephemeral decryption key and the second ephemeral decryption key to obtain and verify the electronic digital signature.

Embodiment 8: The cyber security authentication method according to Embodiment 7, further includes one of: in the displayless networking device application server: implement a signature verification procedure to verify whether the electronic digital signature is correctly signed; and when the result of the signature verification procedure shows that the electronic digital signature is correctly signed, accepting a user to log into the network device management platform. otherwise, rejecting the user to log into the network device management platform.

Embodiment 9: The cyber security authentication method according to Embodiment 1, the displayless networking device is a small cell, a router, a hub, a switch, a bridge, a gateway, a brouter, a relay, a repeater, an edge server, a microcontroller, a processor, an automated teller machine, a point-of-sale machine, a PC workstation, a machine tool, a programmable logic controller, an unmanned vehicle, an IP cam, a satellite phone, a CAN bus node, a network address translation, a server loading balancing device, an application delivery controller, or an application switch.

Embodiment 10: The cyber security authentication method according to Embodiment 2, the optical identifier is a two-dimensional pattern code or a QR code, the user device is a smart phone, a tablet device, a notebook computer, or a desktop computer, and the display-attached network device is a smart phone, a tablet device, a notebook computer, or a desktop computer.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A cyber security authentication method, comprising:
    randomly generating an ephemeral decryption key in a displayless networking device application server;
    generating an optical identifier in the displayless networking device application server and storing the ephemeral decryption key and a network address of the displayless networking device application server in the optical identifier;
    displaying the optical identifier on top of a login page displayed by a web browser on a display-attached network device communicatively connected with the displayless networking device application server;
    sensing the optical identifier by lens on a user device to obtain the ephemeral decryption key and the network address stored therein in the user device, so as to provide the ephemeral decryption key and the network address of the displayless networking device application server to the user device via the optical identifier;
    performing an ephemeral credential acquisition process in the user device based on the ephemeral decryption key and the network address to obtain an ephemeral credential; and
    performing a multi-party multi-factor dynamic strong encryption authentication scheme to authenticate an identity information representing the user device based on the ephemeral decryption key and the ephemeral credential at least by the user device, the displayless networking device application server, and a security server.

2. The cyber security authentication method according to claim 1, further comprising an unknown device binding procedure, wherein the unknown device binding procedure further comprises:
    operating the web browser executed and displayed in the display-attached network device to access the login page of a network device management platform for managing an displayless networking device by performing an access action through the display-attached network device;
    in response to the access action, randomly generating the ephemeral decryption key in the displayless networking device application server and obtaining the network address of the displayless networking device;
    generating the optical identifier in the displayless networking device application server and storing the ephemeral decryption key and the network address in the optical identifier;
    displaying the optical identifier at the top of the login page displayed by the web browser;
    sensing the optical identifier by operating the user device to obtain the ephemeral decryption key and the network address in the user device; and
    binding the network address with the identity information.

3. The cyber security authentication method according to claim 2, wherein the ephemeral credential acquisition process further comprises:
 in the user device:
  receiving the ephemeral decryption key as a first ephemeral decryption key;
  forming a second ephemeral decryption key based on a part of the first ephemeral decryption key to encrypt the identity information to generate an electronic digital signature, and create an authentication token as the ephemeral credential accordingly;
  releasing the first ephemeral decryption key and the second ephemeral decryption key to the security server and retrieving a key index from the security server; and
  selectively combining the identity information, the key index, and the authentication token to form an ephemeral string as the ephemeral credential.

4. The cyber security authentication method according to claim 2, further comprising an unknown device authentication procedure, wherein the unknown device authentication procedure further comprises:
 in the user device, encrypting the identity information into an encrypted data based on the ephemeral decryption key;
 transmitting the encrypted data and the ephemeral credential from the user device to the displayless networking device application server; and
 transmitting the ephemeral credential from the displayless networking device application server to the displayless networking device.

5. The cyber security authentication method according to claim 4, wherein the unknown device authentication procedure further comprises an intermediate authentication process, wherein the intermediate authentication process further comprises:
  instructing the web browser executed in the display-attached network device to redirect back to the login page by the displayless networking device application server to provide for the user to enter an authentication information for logging into the network device management platform, and carrying the ephemeral credential in the login page;
  providing the login page by the web browser for the user to enter the authentication information in the login page by operating the web browser;
  verifies whether the authentication information is correct or not in the displayless networking device;
  when the authentication information is confirmed as correct in the displayless networking device, returning the ephemeral credential back to the displayless networking device application server and requesting the displayless networking device application server to authenticate the identity information;
  decrypting the encrypted data in the displayless networking device application server based on the ephemeral decryption key to obtain the identity information; and
  verifying whether the identity information matches the authentication information in the displayless networking device application server.

6. The cyber security authentication method according to claim 5, wherein the unknown device authentication procedure further comprises:
  when it is confirmed that the identity information matches the authentication information in the displayless networking device application server, transmitting the ephemeral credential and the identity information to the security server and requesting the security server to authenticate the identity information;
  receiving the identity information by the security server;
  authenticating the identity information by the security server;
  returning an authentication result back to the displayless networking device application server from the security server;
  receiving the authentication result by the displayless networking device application server; and
  when the authentication result is authentic, instructing the web browser executed in the display-attached network device to redirect to a homepage of the network device management platform by the displayless networking device application server.

7. The cyber security authentication method according to claim 2, wherein the multi-party multi-factor dynamic strong encryption authentication scheme further comprises:
 in the user device:
  randomly generating a first ephemeral decryption key based on the identity information;
  generating a second ephemeral decryption key based on a part of the first ephemeral decryption key to encrypt the identity information to generate an electronic digital signature, and create an authentication token accordingly;
  releasing the first ephemeral decryption key and the second ephemeral decryption key to the security server and retrieving a key index from the security server; and
  combining the identity information, the key index, and the authentication token to form an ephemeral string as the ephemeral credential, and transmitting the ephemeral credential to the displayless networking device application server; and
 in the displayless networking device application server:
  parsing the ephemeral string comprised in the ephemeral credential to obtain the identity information, the key index, and the authentication token and requesting the security server to retrieve the first ephemeral decryption key and the second ephemeral decryption key based on the key index; and
  decrypting the authentication token based on the first ephemeral decryption key and the second ephemeral decryption key to obtain and verify the electronic digital signature.

8. The cyber security authentication method according to claim 7, wherein the multi-party multi-factor dynamic strong encryption authentication scheme further comprises:
 in the displayless networking device application server:
  implement a signature verification procedure to verify whether the electronic digital signature is correctly signed; and
  when the result of the signature verification procedure shows that the electronic digital signature is correctly signed, accepting a user to log into the network device management platform, otherwise, rejecting the user to log into the network device management platform.

9. The cyber security authentication method according to claim 2, wherein the optical identifier is a two-dimensional pattern code or a QR code, the user device is a smart phone, a tablet device, a notebook computer, or a desktop computer, and the display-attached network device is a smart phone, a tablet device, a notebook computer, or a desktop computer.

10. The cyber security authentication method according to claim 1, wherein the displayless networking device is a small cell, a router, a hub, a switch, a bridge, a gateway, a brouter, a relay, a repeater, an edge server, a microcontroller, a processor, an automated teller machine, a point-of-sale machine, a PC workstation, a machine tool, a programmable logic controller, an unmanned vehicle, an IP cam, a satellite phone, a CAN bus node, a network address translation, a server loading balancing device, an application delivery controller, or an application switch.

* * * * *